(12) United States Patent
Wilkerson

(10) Patent No.: US 12,250,933 B2
(45) Date of Patent: Mar. 18, 2025

(54) TEMPERATURE-REGULATED LIQUID CONTAINER

(71) Applicant: Larry James Wilkerson, Steamboat Rock, IA (US)

(72) Inventor: Larry James Wilkerson, Steamboat Rock, IA (US)

( * ) Notice: Subject to any disclaimer, the term of this patent is extended or adjusted under 35 U.S.C. 154(b) by 25 days.

(21) Appl. No.: 18/060,923

(22) Filed: Dec. 1, 2022

(65) Prior Publication Data
US 2023/0165215 A1 Jun. 1, 2023

Related U.S. Application Data

(60) Provisional application No. 63/285,037, filed on Dec. 1, 2021.

(51) Int. Cl.
*A01K 7/02* (2006.01)

(52) U.S. Cl.
CPC .............. *A01K 7/027* (2013.01); *A01K 7/025* (2013.01)

(58) Field of Classification Search
CPC ................................ A01K 7/025; A01K 7/027
See application file for complete search history.

(56) References Cited

U.S. PATENT DOCUMENTS

| | | | | |
|---|---|---|---|---|
| 5,983,889 | A * | 11/1999 | Thomas | A01K 7/027 126/378.1 |
| 7,281,494 | B1 * | 10/2007 | Connerley | A01K 7/02 119/77 |
| 10,383,311 | B1 * | 8/2019 | Kane | A01K 39/024 |
| 11,317,604 | B1 * | 5/2022 | Pang | A01K 7/022 |
| 11,337,405 | B1 * | 5/2022 | Dinger | A01K 7/025 |
| 2004/0118356 | A1 * | 6/2004 | Krishnamurthy | A01K 7/025 119/74 |
| 2006/0207515 | A1 * | 9/2006 | Palett | A01K 7/02 119/78 |
| 2010/0276410 | A1 * | 11/2010 | Hudson | A01K 63/06 250/504 R |
| 2019/0289819 | A1 * | 9/2019 | Ranck | A01K 7/025 |
| 2019/0373852 | A1 * | 12/2019 | Figgins | A01K 7/04 |
| 2020/0084999 | A1 * | 3/2020 | Yoo | H02J 50/90 |
| 2020/0085002 | A1 * | 3/2020 | Yoo | B67D 1/10 |
| 2020/0085003 | A1 * | 3/2020 | Yoo | A01K 7/027 |
| 2020/0085004 | A1 * | 3/2020 | Yoo | A01K 7/025 |
| 2020/0085005 | A1 * | 3/2020 | Yoo | B67D 1/0004 |
| 2020/0085006 | A1 * | 3/2020 | Yoo | A01K 7/022 |

(Continued)

*Primary Examiner* — Monica L Perry
*Assistant Examiner* — Aaron M Rodziwicz
(74) *Attorney, Agent, or Firm* — Fredrikson & Byron, P.A.

(57) ABSTRACT

A temperature regulation system including a first body forming a first interior cavity and a second body forming a second interior cavity. The first body includes a first opening defined in a wall of the first body. The first interior cavity is in fluidic communication with the first opening and the first interior cavity is configured to contain a liquid. The second body includes a second opening defined within a wall of the second body. A first temperature control module can be disposed within the second body and can include a fan. The first temperature control module is in fluidic communication of a fluid comprising air with the first interior cavity via the first and second openings. The fan is configured to direct a flow of air from the second interior cavity to the first interior cavity at a location adjacent the liquid.

20 Claims, 10 Drawing Sheets

(56) References Cited

U.S. PATENT DOCUMENTS

| | | | |
|---|---|---|---|
| 2020/0085014 A1* | 3/2020 | Yoo | B67D 1/0004 |
| 2020/0086244 A1* | 3/2020 | Yoo | B01D 35/02 |
| 2020/0087135 A1* | 3/2020 | Youn | B01D 35/30 |
| 2020/0091756 A1* | 3/2020 | Yoo | A01K 7/025 |
| 2020/0091769 A1* | 3/2020 | Yoo | H02J 50/10 |
| 2021/0144963 A1* | 5/2021 | Wang | C02F 1/42 |
| 2021/0144964 A1* | 5/2021 | Wang | B01D 39/1623 |
| 2021/0179413 A1* | 6/2021 | Goodman | A01K 7/025 |
| 2021/0212287 A1* | 7/2021 | Wang | A01K 7/025 |
| 2021/0345582 A1* | 11/2021 | Yoo | G01C 9/02 |
| 2023/0157259 A1* | 5/2023 | Xue | A01K 7/025 |
| | | | 119/74 |

* cited by examiner

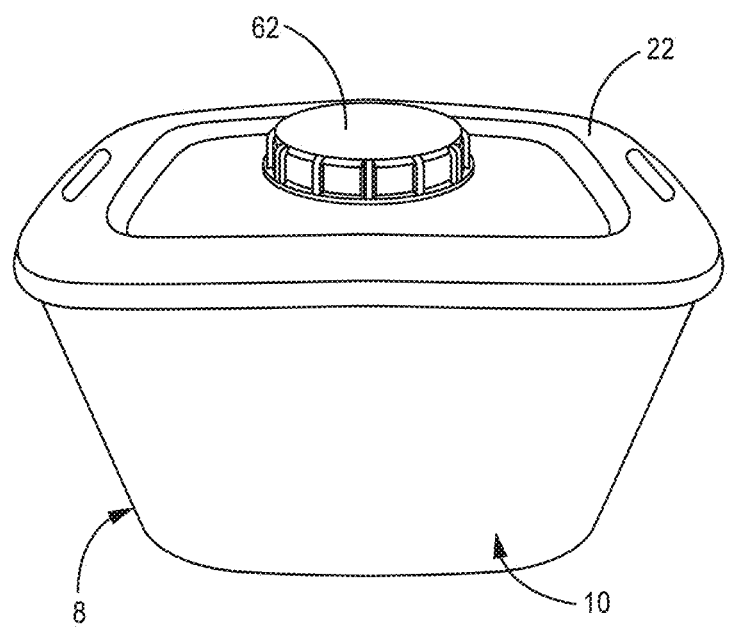
FIG. 13
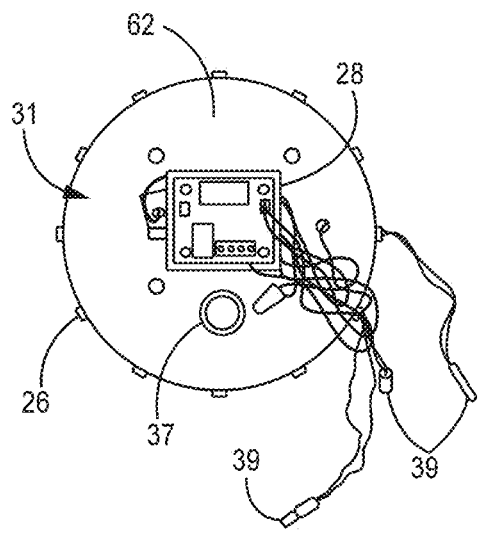 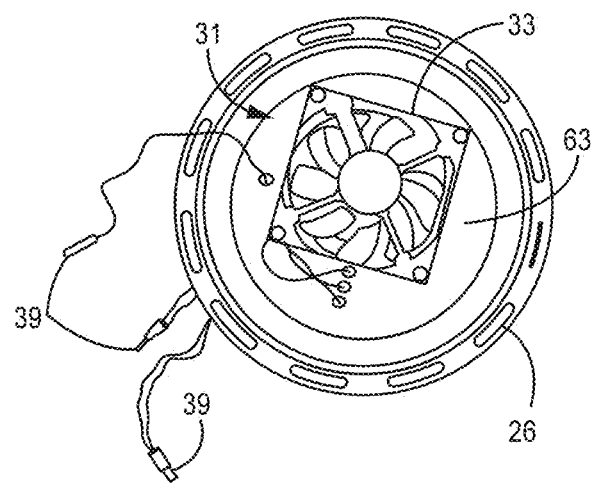
FIG. 14A  FIG. 14B

TEMPERATURE-REGULATED LIQUID CONTAINER

CROSS-REFERENCE TO RELATED APPLICATIONS

This application claims the benefit under 35 U.S.C. § 119(e) to U.S. Provisional Application 63/285,037, filed Dec. 1, 2021 and entitled Freeze Resistant Water Container, which is hereby incorporated herein by reference in its entirety.

FIELD

The various embodiments herein relate to temperature-regulated liquid containers, and more particularly to temperature-regulated watering vessels for livestock.

BACKGROUND

Many watering troughs are open-topped containers of varying size, including various examples ranging from 15 gallons to 600 gallons, and are used to provide access to water for both livestock and domesticated animals. In selecting a watering trough, owners may weigh a variety of considerations, such as convenience of use, low cost, durability, portability, and tradition. The environment in which the containers will be used is also a factor which may be considered. As a result, containers may be designed for use in many different environments, each posing unique maintenance needs and challenges. Depending on these environmental conditions, debris such as dust, hay, leaves, food droppings, algae contamination, or animal excrement may enter the open-topped containers and contaminate the liquid therein, making the water unsuitable for animal consumption. This contamination results in necessary cleaning of the open-topped liquid container, which can occur on a regular basis, such as, for example, a weekly basis. During the cleaning process, the water may need to be drained from the container, which may result in the loss of several gallons of water.

During colder temperatures, the water within these containers may freeze, which poses an additional challenge to the maintenance of watering troughs. If the liquid freezes, the owner or maintenance provider may need to break the ice in order to remove the water from the trough, which requires additional labor and tools. Water from alternative sources may also need to be provided to the animals. To prevent the liquid inside the containers from freezing, different heating element configurations may be integrated into the liquid containers. Some liquid containers include heating elements submerged in water. Other configurations for heating elements include floating heating elements, bubblers, de-icers, and heated containers. Submersible heating elements are designed to heat the entire volume of the liquid within the container. Floating bubblers agitate the surface of the water. Floating heaters or de-icers heat the surface of the water. These solutions may result in greater operating costs, as many of these devices operate using a higher wattage, generally, from 500 watts to 1500 watts, which run continuously to supply heat to large volumes of water. Furthermore, some livestock owners may have concerns regarding the safety of the livestock drinking from a watering trough with a submerged electrical element.

There is a need in the art for liquid containers with improved heating configurations and reduced operating costs.

BRIEF SUMMARY

Discussed herein are various liquid containers with temperature regulation modules.

In Example 1, a temperature regulation system comprises a first body forming a first interior cavity with a first opening defined in a wall of the first body, wherein the first body interior cavity is in fluidic communication with the first opening. The temperature regulation system comprises a second body forming a second interior cavity, the second body comprising a second opening defined within a wall of the second body. The temperature regulation system comprises a first temperature control module disposed within the second body, wherein the first temperature control module is in fluidic communication with the first interior cavity via the first and second openings.

Example 2 relates to the temperature regulation system according to Example 1, wherein the first temperature control module comprises a temperature sensor, a fan, and a positive temperature coefficient heating element.

Example 3 relates to the temperature regulation system according to Example 2, wherein the first body comprises a removable top panel and the second body is coupled to the removable top panel of the first body Example 4 relates to the temperature regulation system of Example 2, wherein an external surface of the second body is coupled to an interior surface of the first interior cavity of the first body.

Example 5 relates to the temperature regulation system of Example 2, wherein an external surface of the second body is coupled to an exterior surface of the first body.

Example 6 relates to the temperature regulation system of Example 2, wherein the first and second openings are disposed above a maximum height of a liquid disposed within the interior cavity of the first body.

Example 7 relates to the temperature regulation system of Example 1, wherein the temperature regulation system further comprises a water level sensor for measuring water levels and regulating electricity to the first temperature control module.

Example 8 relates to the temperature regulation system of Example 1, wherein the second body is a removable cap.

Example 9 relates to the temperature regulation system of Example 2, wherein the temperature regulation system further comprises a halogen bulb coupled to the first body of the temperature regulation system.

Example 10 relates to the temperature regulation system of Example 9, wherein the first body of the temperature regulation system is insulated.

Example 11 relates to the temperature regulation system of Example 2, wherein the temperature regulation system further comprises a water access opening within the first body covering panel.

Example 12 relates to the temperature regulation system of Example 1, wherein the temperature regulation system further comprises a drinking bowl coupled to the first body, wherein the temperature control module is in fluidic access with the drinking bowl.

In Example 13, a temperature regulation system for an animal watering device comprises a liquid container forming a first interior cavity and a first temperature control module in fluidic access with the first interior cavity of the liquid container, wherein the first temperature control module is coupled to the liquid container.

Example 14 relates to the temperature regulation system of Example 13, wherein the liquid container comprises a removable top panel and the temperature control module is coupled to an interior surface of the removable top panel of the liquid container.

Example 15 relates to the temperature regulation system of Example 13, wherein the temperature regulation system further comprises a water level sensor for measuring water levels and regulating electricity to the first temperature control module.

Example 16 relates to the temperature regulation system of Example 13, wherein the first temperature control module is coupled to the liquid container above a maximum height to which a liquid may be filled in the liquid container.

Example 17 relates to the temperature regulation system of Example 15, wherein the first temperature control module further comprises a drinking bowl coupled to the liquid container, wherein the temperature control module is in fluidic access with the drinking bowl.

Example 18 relates to a method of regulating temperature in a liquid container comprising configuring a temperature sensor to recognize a predetermined air low temperature threshold, configuring a temperature sensor to recognize a predetermined air high temperature threshold, adding heated air to the liquid container when the temperature sensor detects the low air temperature threshold and ceasing the addition of heated air to the liquid container when said temperature sensor detects the air high temperature threshold, The liquid container comprises a first body forming a first interior cavity, the first body comprising a first opening defined in a wall of the first body, wherein the first interior cavity is in fluidic communication with the first opening, a second body forming a second interior cavity, the second body comprising a second opening defined within a wall of the second body, and a first temperature control module disposed within the second body, wherein the first temperature control module is in fluidic access with the first interior cavity via the first and second openings.

Example 19 relates to the method of regulating temperature of Example 18, the method further comprising configuring a water level sensor coupled to the first body to recognize a user-selected water level threshold.

Example 20 relates to the method of regulating temperature of Example 19, further comprising discontinuing an electrical connection of a heating module when a water level threshold is not recognized by the water level.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

BRIEF DESCRIPTION OF THE DRAWINGS

FIG. 13 is a perspective view of a liquid container, according to a further embodiment.

FIG. 14A and FIG. 14B are front views of a cap of a second body comprising a heating module of a liquid container.

DETAILED DESCRIPTION

The various embodiments herein relate to temperature-regulated liquid containers (hereinafter referred to as a "liquid container" and "liquid containers"). In the various liquid container implementations herein, the elements regulating the temperature of the liquid container are housed in a second body coupled to the liquid container.

Figure 1A:
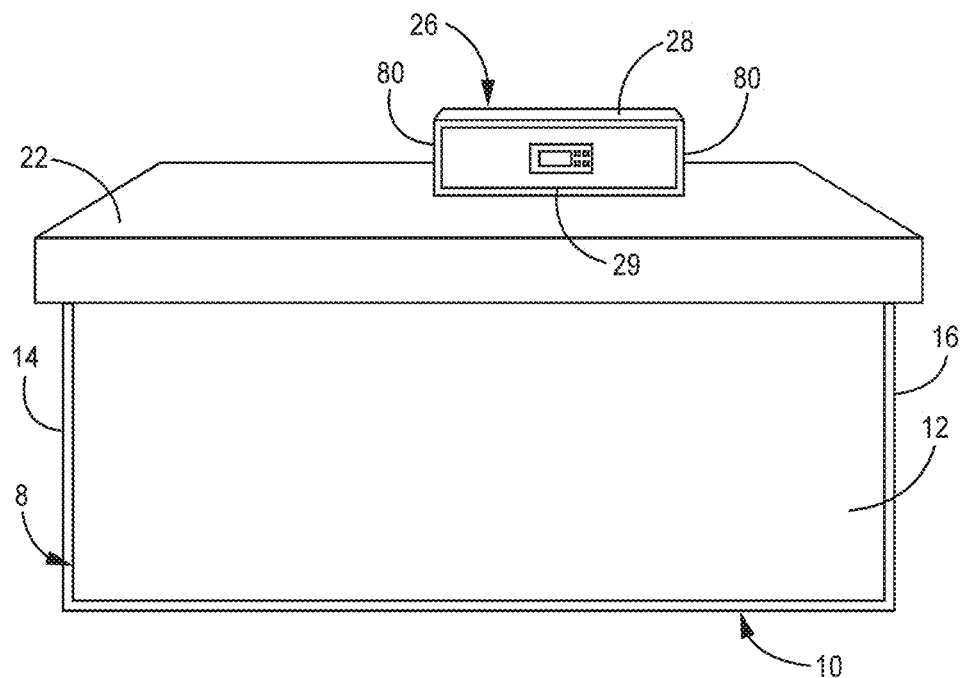
FIG. 1A and FIG. 1B are front and rear views of a freeze-resistant liquid container.
Figure 1B:
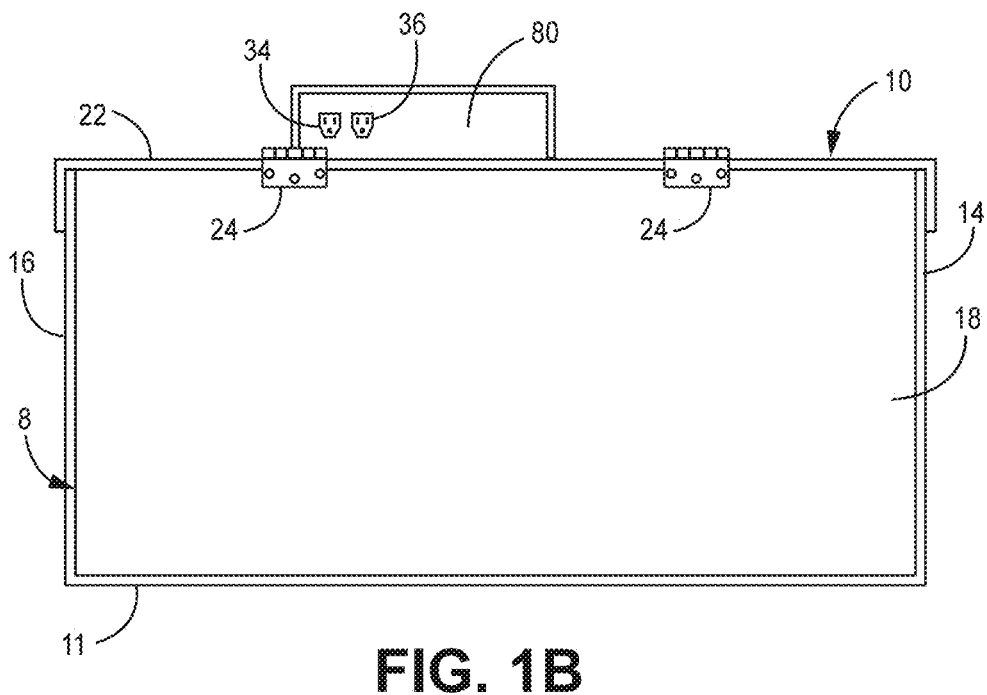

FIG. 1A and FIG. 1B are front and rear views of one exemplary embodiment of a temperature-regulated watering apparatus 8. The apparatus 8 may have two bodies: a first body (or "container" or "liquid container") 10 and a second body 26. The first body 10 includes a base 11 and multiple walls (or "panels") 12, 14, 16, forming a first interior cavity (not shown) defined within the base and walls 11, 12, 14, 16. The base 11 is the bottom or underside component of the body 10 (to which the walls 12, 14, 16 are connected). The first interior cavity (not shown) may be used to store or house liquid including, for example, water. In some embodiments, the apparatus 8 can be a watering trough 8. The first body 10 may be rectangular, square, round, or other known shapes. The first body 10 may be made from metal, wood, plastic, or other materials. It may be multiple parts assembled together, or may be a molded to the desired shape of the liquid container.

As mentioned above, the first body 10 can include a front panel 12, a rear panel 18, and side panels 14, 16. In some embodiments, the first body 10 can include a lid 22, which may be hingedly attached to the rear panel 18. The lid 22 can then pivot about a hinge 24 pivot axis, providing access to the interior cavity. In other embodiments, the lid 22 may be attached by any other known means of attachment, such as a latch, or may not be attached to the first body 10 at all. To access the first interior cavity (not shown), the lid 22 may need to be lifted or removed entirely from the first body 10. In some embodiments, the lid 22 may be kept open by leaning the lid 22 against a structure (not pictured) to keep the lid 22 propped open. The lid 22 may be secured along the front panel by latches, screws, or other mechanical fasteners.

In various implementations, the liquid container 10 may be filled to any level selected by a user. When liquid fills the liquid container 10, a space may remain between the surface of the liquid and the interior surface of the lid. The temperature of the air in this space may be used to calculate the air temperature of the first cavity (not shown) in the first body 10.

In various embodiments herein, the watering apparatus 8 includes a second body 26. The second body 26 can be formed by a base 29 and at least one wall 80, which form a second interior cavity (not shown). The second interior cavity can house a heating module or apparatus. Any surface of the second body 26 may be coupled to a surface of the first body 10. For example, the base 29 of the second body 26 may be coupled to the covering or lid 22 of the first body 10 as depicted in FIGS. 1A and 1B. Alternatively, in other embodiments, any wall 29, 80 of the second body 26 may be coupled to any wall 12, 14, 16, 18 of the first body 10. In further alternatives, the second body 26 may be structured such that a surface of the first body 10 is also a surface of the second body 26. The second body 26 may be square, round, or other known shapes. In some embodiments, the second body 26 may be the same shape as the first body 10. In other embodiments, the second body 26 may be a different shape than the first body 10. Like the first body 10, the second body 26 may be formed by multiple parts assembled together or may be molded to form a second body 26 shape. The material of the second body 26 may be wood, plastic, or any other known materials. In certain embodiments, the second body 26 may be made of the same material as the first body 10, or it may be made of a different material. The second body 26 houses the heating module or apparatus that regulates the temperature of air above the liquid in the liquid container 10. At least one electrical port or coupling can be disposed on the second body 26 in order to connect the heating apparatus (not shown) to an external electricity source. For example, in the specific embodiment of FIG. 1B, the apparatus 8 has a male plug 34 and a female plug 36 on an outer surface of the second body 26. Alternatively, any known electrical connection or coupling can be provided to allow for connection to an external electricity source.

Figure 2:
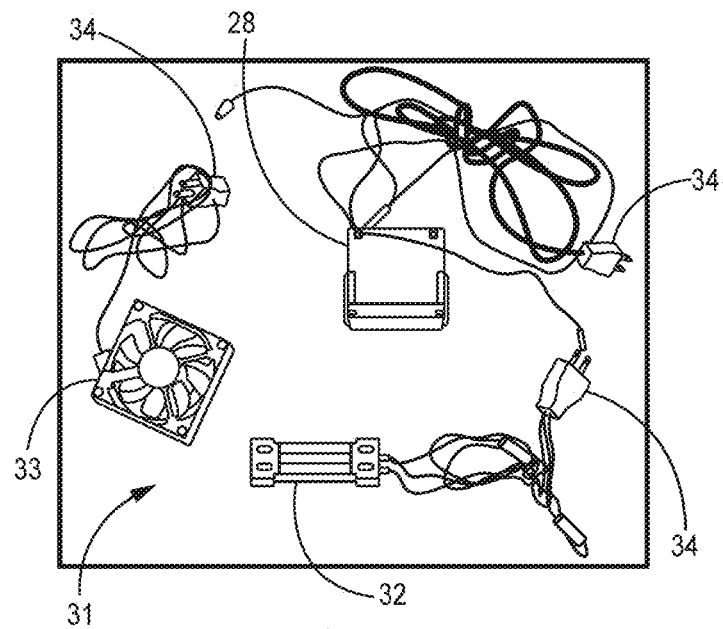
FIG. 2 is an expanded view of the elements comprising a heating module of a freeze-resistant water container.

FIG. 2 illustrates the components that may make up a heating module or apparatus 31, according to one embodiment. The heating module 31 may comprise a fan 33, a temperature control device 28, a heating element 32, and other electrical components. The temperature control device 28 can be a temperature probe or a thermostat. These components may operate using alternating current. The fan 33, temperature probe 28, and heating element 32 may each be connected to an electrical power source using male power plugs 34 connected to each component of the heating module. The temperature probe 28 may be configured to identify a low temperature threshold, a high temperature threshold, or both a high and a low temperature threshold. In some embodiments, the heating element 32 is a positive temperature coefficient heating element. Alternatively, any known heating element can be used.

The temperature probe 28 may recognize a range between −58° F. and 210° F. Alternatively, the probe 28 can be any known temperature probe 28 that recognizes any standard range of temperature for such a probe 28. In some embodiments, the low temperature set point may be 32° F. In other embodiments, the low temperature set point may be the freezing temperature of the liquid housed within the storage container.

Figure 3:
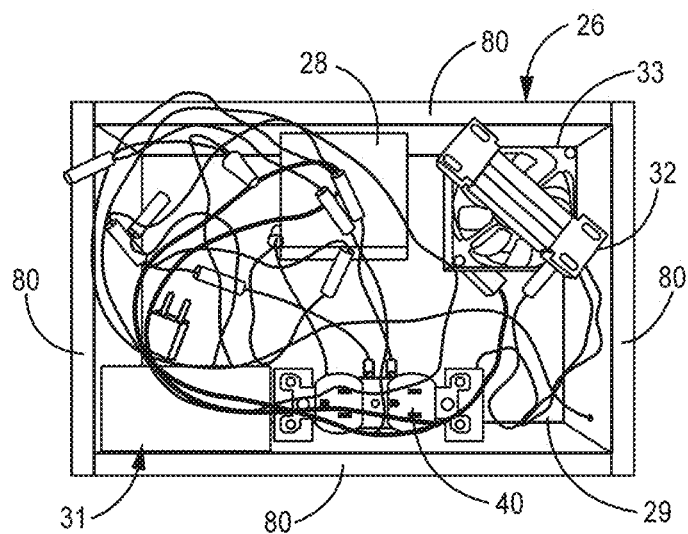
FIG. 3 is a top-down view of the second body of a freeze-resistant liquid container.

FIG. 3 illustrates one implementation of a heating module 31 disposed within a second body 26. In certain embodiments, the heating element 32 is placed adjacent to a fan 33. The fan 33 can be mounted over at least one opening (not shown) in the second body 26. This opening permits fluidic access between the first body 10 and the second body 26 such that the fan 33 can urge heated air from the interior of the second body 26 into the interior of the first body 10. A temperature probe 28 may be inserted into at least one opening to measure the air temperature within the first body 10. The temperature probe 28 may be inserted into the same opening as the opening in which the fan 33 is inserted, or it may be inserted into a different opening. When the probe 28 detects that the temperature within the first body 10 reaches a predetermined low temperature, the probe 28 can trigger electricity to be transmitted to the heating element 32 and/or fan 33. The heating element 32 may be mounted atop, below, or near the fan 33 such that, during operation, the fan 33 may then circulate the heated air produced by the heating element 32 through the opening in the second body 26 and into the interior cavity of the first body 10. This raises the temperature of the air above the liquid housed in the liquid container 10, preventing the surface from freezing. An electrical port 40 may be coupled to or otherwise disposed within the second body 26. In one embodiment, the electrical port 40 is a standard outlet. Alternatively, any known electrical source connection or port can be used. The means for coupling the outlet to the body may be by screw, or by other mechanical connectors. The electrical components can operate using electricity provided by connecting the heating module components to the electrical outlet 40. The heating module 31 can operate using standard electrical current. Alternatively, any known electrical current or power source can be used. The cycle of heating and cooling may continue until the ambient temperature surrounding the watering apparatus 8 is high enough to allow the internal temperature of the container to remain above the set temperature low point.

As mentioned above, the operation of the heating apparatus 31 may be dependent on the measured air temperature within the first body 10. When the temperature reaches a low set point or minimum threshold and the temperature sensors 28 register this low temperature, electricity is then supplied to the heating element 32. When electricity is supplied to the heating element 32, the heating element 32 is activated and begins to radiate heat. The heat then warms the air surrounding the heating element 32 within the second body 26. In some embodiments, the heating element 32 may reach a temperature of up to 200° F. Alternatively, the heating element 32 can be any known heating element 32 that reaches any standard temperature for such an element. As also mentioned above, electricity can also be supplied to the fan 33 to circulate air. When the heating element 32 is next to the fan 33, the fan 33 circulates the warmed air, effectively raising the air temperature in the interior cavity of the first container 10. When a high set temperature (the predetermined upper temperature threshold) is recorded by the temperature sensors 28, the sensors 28 can trigger that the electricity be cut off to the components of the heating module 31. In some embodiments, this may be a temperature of 40° F. Alternatively, the threshold temperature can be any known temperature above freezing, and can, in some embodiments, be adjustable. The change in air temperature may create a cycle of intermittent heating and cooling such that the air temperature remains a temperature above the freezing point of the liquid housed in the liquid container 10. Circulating the warmed air next to the liquid housed in the liquid container 10 can raise the surface temperature of the liquid, preventing the liquid from freezing within the container 10. This permits the liquid to remain accessible in cold temperatures.

Figure 4:
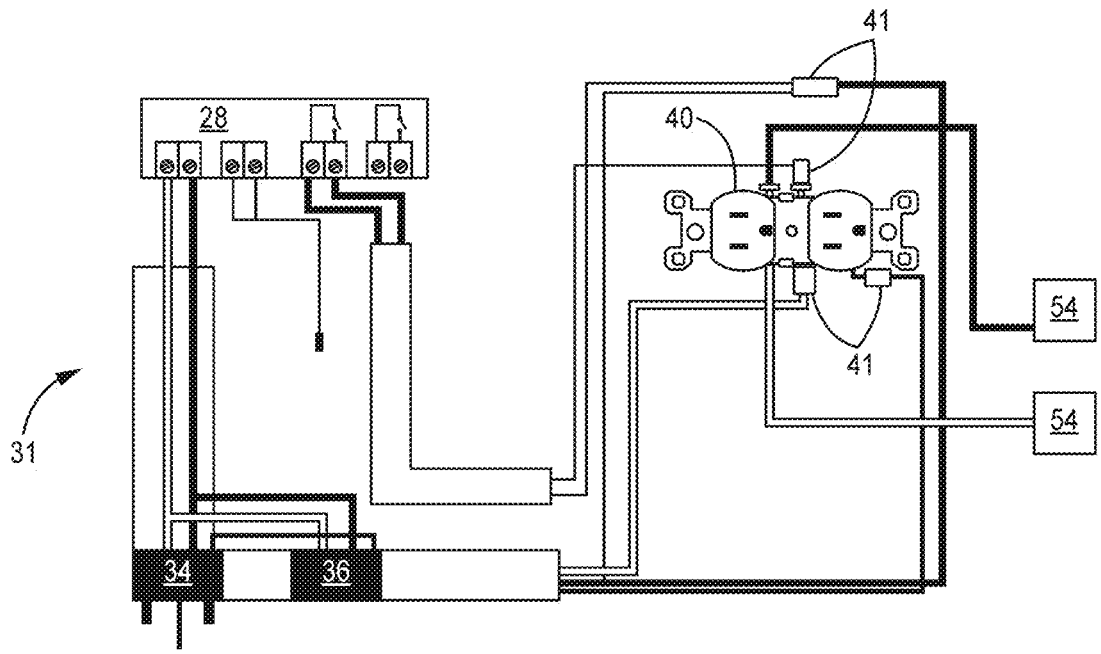
FIG. 4 is a diagram displaying the electrical configurations of the heating module of the liquid container.

FIG. 4 illustrates one embodiment of the electrical system of the heating module 31. In this embodiment, electrical connectors 41 may be connected to the outlets 40. The electrical connectors 41 may connect wires from the outlet 40 to components 34, 36 which may be connected to an outside power source. Electrical connectors may provide electricity to water valves 54. Electricity may be supplied to one valve or multiple valves. The electrical connectors may also connect various wires to one another. These may also be connected to additional sensors 28, which may be configured to recognize a temperature threshold set to a user's preferences. The temperature sensor 28 may also be connected using wiring to an outside power source. The outside power source may be connected to the heating module 31 using the female plug 36 and male plug 34 mentioned above (and depicted in FIG. 1). As discussed above, the male plug 34 and the female plug 36 may protrude from an exterior surface of the second body. Alternatively, any electrical connection or port can be used to couple the components of the heating module 31 to an outside electrical source.

Figure 5:
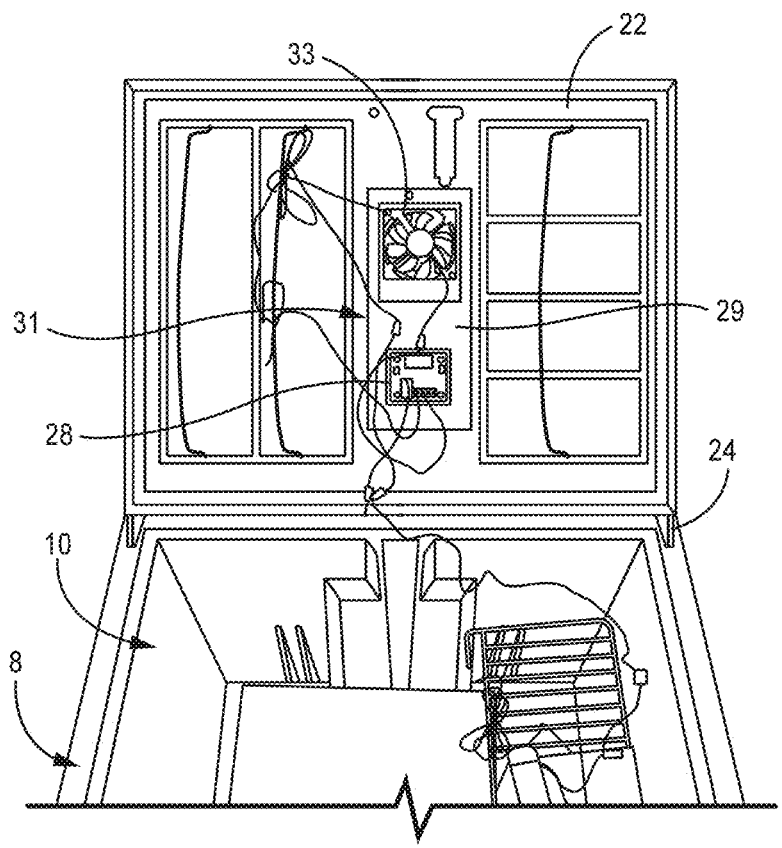
FIG. 5 is a perspective view of an alternative embodiment of a liquid container.

FIG. 5 illustrates an alternative embodiment of a watering apparatus 8. In some embodiments, the components of the heating module 31 may be attached to the interior of the first body 10, such that the components are not within a second body. That is, certain watering apparatus 8 implementations have no second body. In some embodiments, the components may be mounted to the interior surface of the lid 22. In this embodiment, the heating module 31 components may be attached to the lid 22 using a screw or any other known mechanical fastener.

Figure 6:
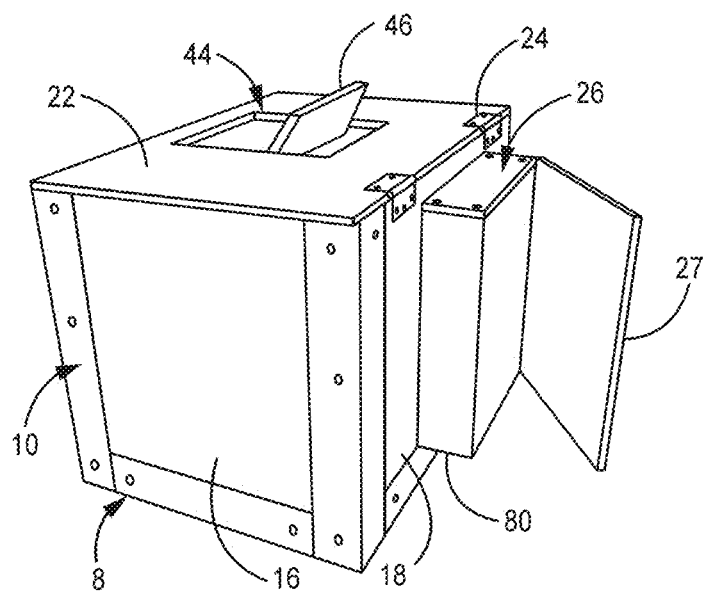
FIG. 6 is a perspective view of an alternative embodiment of the liquid container.

FIG. 6 illustrates another alternative embodiment of the watering apparatus 8. The apparatus 8 may be used as a watering trough for animals. The watering trough 8 can have a first body 10 with a base (not shown), a front (not shown), a rear 18, and two side panels 16. Except as discussed below, the various components of this apparatus 8 are substantially similar or identical to the components of the apparatus 8 depicted in FIGS. 1A-4 as described in detail above.

Figure 7:
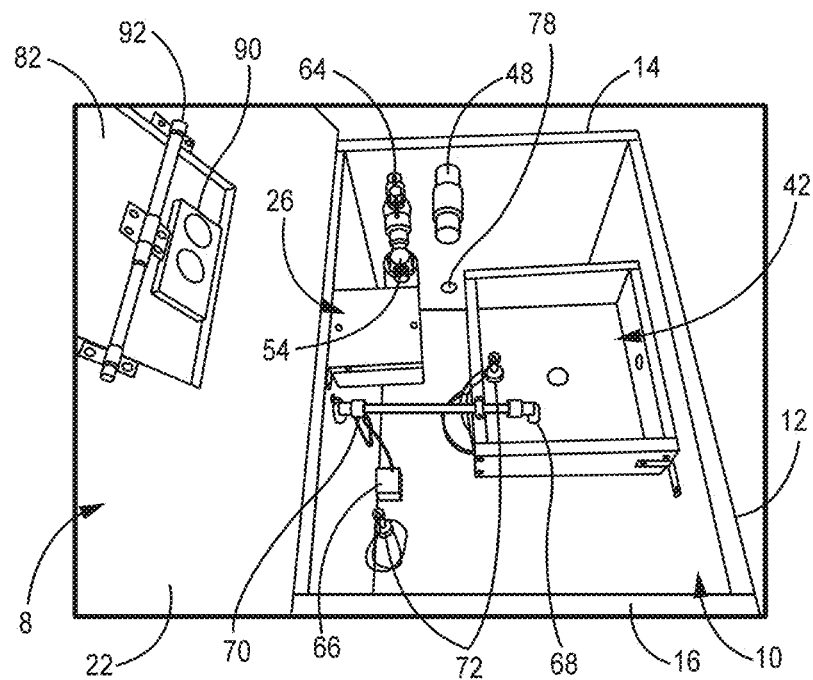
FIG. 7 is a top-down perspective view of the interior cavity of a liquid container.

In this specific implementation, the lid 22 has an access point 44. The access point 44 of the lid 22 is defined by an access panel 46, which can be pivotably attached to the lid 22. According to one embodiment, a pivot rod 92 can be attached to the side of the access panel 46 facing the interior of the lid 22. The access panel 46 may rotate around the pivot rod 92 between an open position (as shown in FIG. 6) and a closed position (as shown in FIG. 7). This configuration permits an animal to approach the watering trough 8, apply pressure to the access panel 46, and press the panel 46 into the liquid container 10 such that the panel 46 pivots about the pivot access point 44, creating an opening 44 and defining the access panel open position. The animal may then use this opening 44 to access the liquid housed within the liquid container 10. A weight 90 may be attached to the bottom surface 82 of the pivotably attached panel 46. When an animal ceases to apply pressure to the panel 46, the force of the weight 90 forces the rear end of the panel 46 to return to its closed position, closing the access panel 46 within the lid. Alternatively, the access panel 46 can be pivotally attached to the lid 22 via any known mechanism or component and can be urged back to its closed position via any known mechanism or component.

FIG. 7 illustrates an alternative embodiment of the watering assembly 8. In this specific implementation, the liquid container 10 contains an elevated drinking bowl 42. The elevated drinking bowl 42 may receive water from a pump 66 attached to pump tubing 68 or a garden hose attached to an inlet of the watering container 10. The drinking bowl 42 may be filled automatically using a variety of sensors 72. For example, the liquid container 10 may regulate its water level using a water level sensor 72. In some embodiments, the water level sensor 72 may be a float arm. Alternatively, any known sensor or mechanism can be used to deliver an appropriate amount of water to the elevated bowl 42.

The sensor 72 may indicate when electricity should or should not be supplied to the electrical components of the pump 66 within the liquid container 10. In other embodiments, the sensor 72 may indicate when the pump 66 should supply more liquid to the bowl 42. When the sensor 72 recognizes that the water level has been reduced to below a predetermined threshold, the sensor 72 may be triggered to cause electricity to be supplied to the water pump 66. The pump 66 will then supply additional water to the elevated bowl 42, until the threshold water level programmed to be recognized by the sensor 72 is met.

Figure 8:
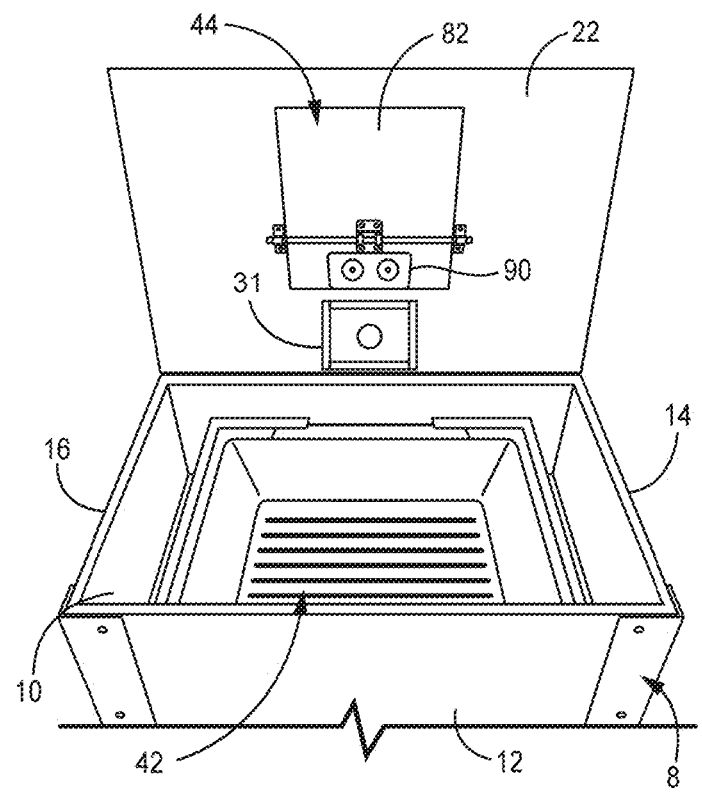
FIG. 8 is a top-down perspective view of the interior cavity of a liquid container.

FIG. 8 illustrates a further alternative embodiment of a watering apparatus 8 with a removable drinking bowl 42. The liquid container 10 may fill with residue such as sand, dirt, or other debris. The residue may enter the liquid container 10 and drinking bowl 42 through the pivoting drink access point 44 within the lid 22. In this embodiment, the drinking bowl 42 may be removable to allow for easily clearing out the debris from the drinking bowl 42. After the drinking bowl 42 has been cleaned, the drinking bowl 42 may be replaced within the liquid container 10. The drinking bowl 42 may be attached to the liquid container 10 by known fasteners, or it may be nested within an internal structure, or by other means. The drinking bowl 42 may be formed by multiple pieces, assembled together. In other embodiments, the drinking bowl 42 may be molded into the interior of the container 10 and cannot be removed. In different embodiments, the drinking bowl 42 may be pivotably attached to the interior of the container 10. When the drinking bowl 42 is pivotably attached to the interior of the container 10, the bowl 42 may pivot upwards. Other embodiments may incorporate bowls 42 or drinking wells into the liquid container 10. In this embodiment, the fan 33 may be mounted to the interior of the lid 22 behind the access point 44.

As discussed above (and returning now to FIG. 7), in some embodiments, the level of the water within the container 10 may be controlled using a float sensor 72. The float sensor 72 can be connected to a main power inlet (or otherwise connected to an external power source) and a submersible water pump 66. The float sensor 72 can control whether the pump 66 is on or off. The water pump 66 in this embodiment is located in a lower portion of the container 10 and connected to a first end of water pump tubing 68. The water pump tubing 68 can have two ends. The second end may terminate in an outlet in the upper portion of the bowl 42. A one-way overflow valve 54 may be installed in an upper portion of the container, preventing water from overflowing. The float sensor 72 may stop the flow of electricity to the pump 66 in the event that the water in the container is low and no additional water can be added to the container.

As shown in FIG. 7, the container 10 can contain a drain plug 78 to prevent the release of liquid from the liquid container 10 and further to allow for removal of the plug 78 when it is desired to allow liquid to be drained from the container 10. The drain plug 78 is located in the bottom of the container 10. Alternatively, the plug 78 can be located on the lower part of one of the walls. The water inlet 48 may be included in the container 10 as well.

Figures 9A, 9B:
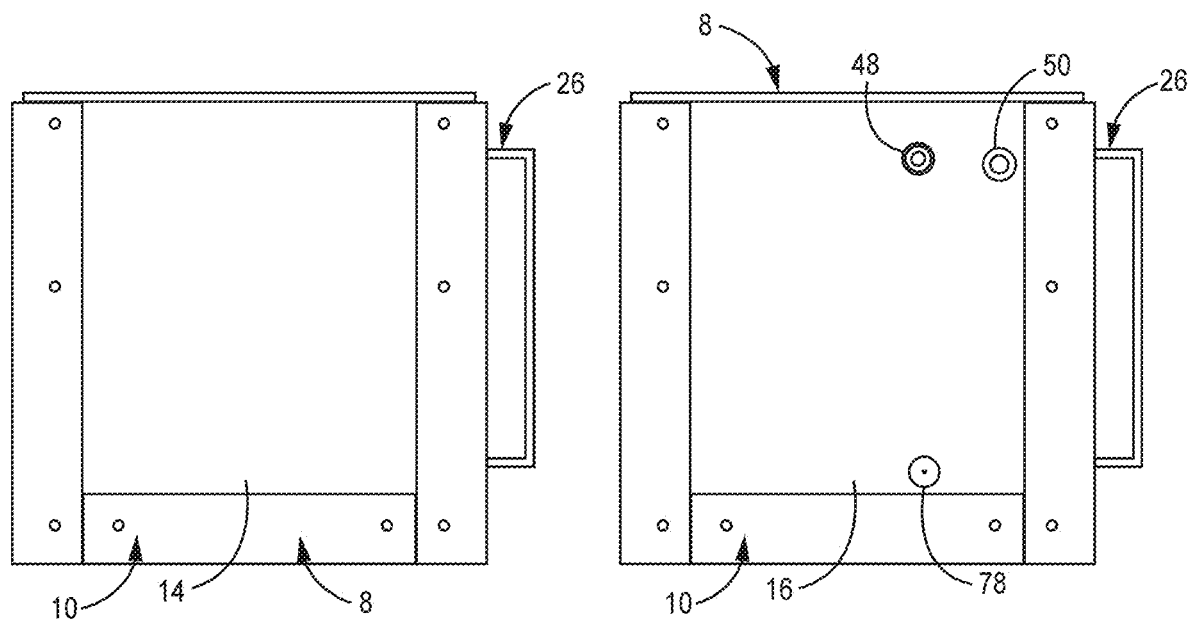
FIGS. 9A and 9B is a side view of a first body of a liquid container.
Figure 9C:
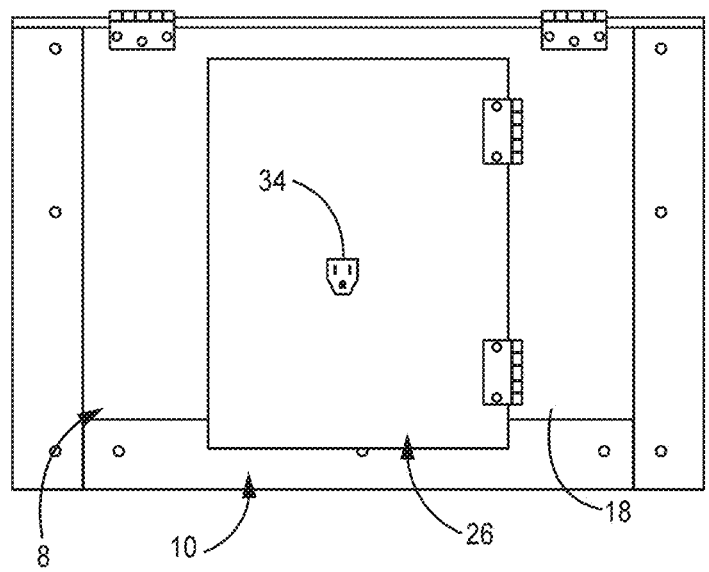
FIG. 9C is a rear view of a first and second body of a liquid container.

FIG. 9A, FIG. 9B, and FIG. 9C each depict side views of a liquid container 10 according to a further implementation. More specifically, FIGS. 9A and 9B depict side panels 14 of the liquid container 10. The side panel 14 of FIG. 9B depicts an embodiment wherein the side panel 14 comprises access points for components of the liquid container 10. For example, the side panel 14 may comprise access points for tubing 48, a water inlet 50, and a drain plug 78. FIG. 9C depicts a rear panel 18 of the liquid container 10. The rear panel 18 is coupled with a second body 26 housing a heating module (not shown). In other words, the second body 26 is attached to the rear panel 18 in this embodiment. The second body 26 may have a male plug 34 to provide electrical access to the heating module. An extension cord may be attached to the male plug 34 of the rear panel 26 to provide electricity. Alternatively, the second body 26 can have any known electrical connection or port to be coupled to an external electrical source. The surface of the second body 26 comprising the male plug 34 may be hingedly attached to the second body 26. It may also be latched, attached using a mechanical fastener, or another attachment method may be used.

In alternative embodiments, the second body 26 may be coupled to any one of the sides, front, or lid of the container 10. In further alternatives, the second body 26 may be coupled to a surface within the liquid container 10. The components within the second body 26 may also be coupled to an interior surface of the liquid container 10 or the lid 22.

In some specific exemplary embodiments, any of the watering apparatus 8 embodiments herein can utilize a 14 watt fan 33, a 100 watt positive temperature coefficient heating element 32, and a temperature control device 28 rated at 3 watts. Alternatively, any known fan, heating element, and/or temperature control device for use in animal watering devices can be used in any of the implementations herein. In one embodiment, the volume of the container 10 is 150 gallons. Alternatively, the container 10 of any embodiment herein can have any known or desired volume. In certain implementations, the heating module 31 only heats the surface above the water in the drinking bowl 42 (or in the container 10 when there is no drinking bow), rather than all 150 gallons of water in the container 10.

Figure 10:
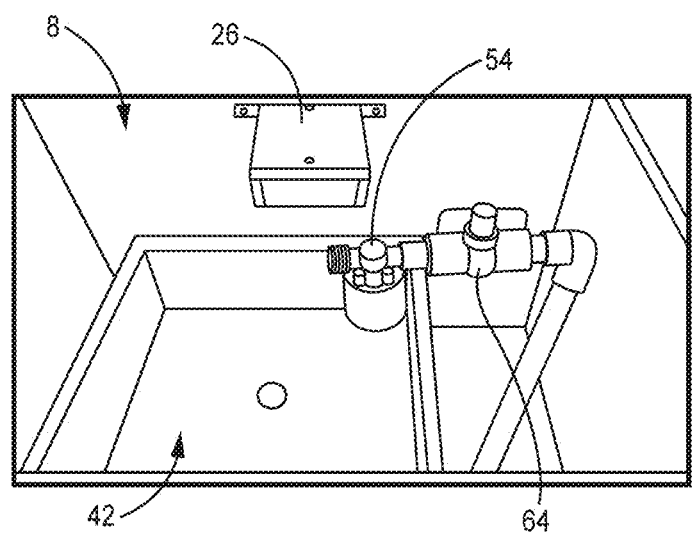
FIG. 10 is a perspective view of an alternative embodiment of the liquid container.

FIG. 10 illustrates an alternative embodiment of the liquid container 10 wherein the water pump does not utilize electricity. In these embodiments, a water control valve 54 can be installed within the drinking bowl 42 and connected to an incoming water line with a shut off valve 64. Such a configuration can be incorporated into any of the watering apparatus embodiments disclosed or contemplated herein. In this embodiment, the lower portion of the container 10 is not used to hold water. That is, only the bowl 42 contains water.

Alternatively, any of the embodiments herein may be powered by solar energy and thus may be attached to a photovoltaic energy source. This energy source may contain a solar panel and solar charge controller. The solar charge controller can be connected to at least one battery providing electrical power. If a photovoltaic energy source is used, the components of the heating module may require direct current.

Figure 11:
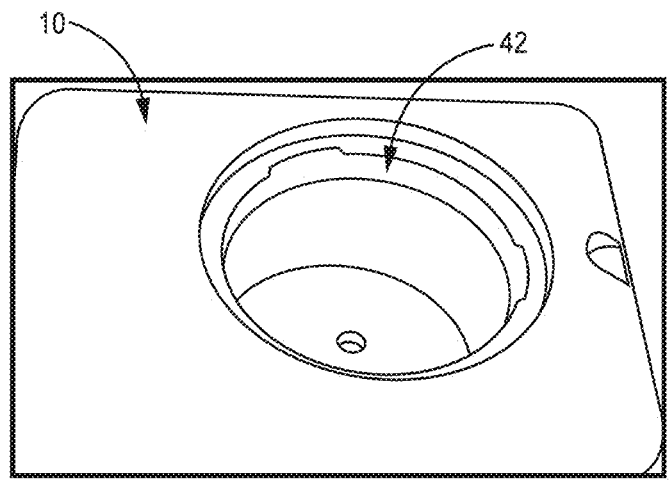
FIG. 11 is a perspective view of a first body of a liquid container, according to a further embodiment.
Figure 12:
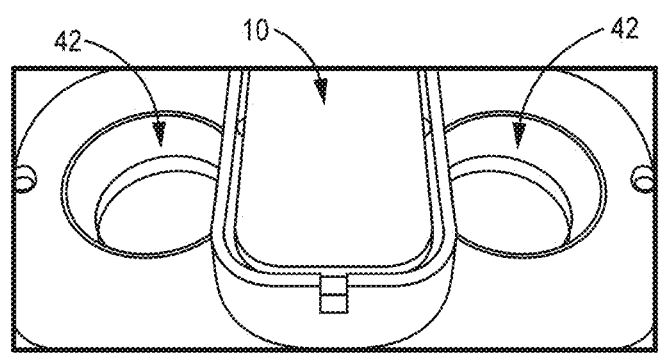
FIG. 12 is a perspective view of a first body of a liquid container, according to a further embodiment.

FIGS. 11 and 12 each depict different watering trough embodiments wherein a second body comprising a heating module may be attached. FIG. 11 depicts a watering trough 10 with one access point 42 providing drinking access for an animal. FIG. 12 depicts a watering trough 10 with two access points 42 providing drinking access for two animals to use the trough 10 at the same time. FIG. 11 and FIG. 12 are both exemplary depictions of different types of troughs and access points which a heating module may be coupled with. If there is more than one access point 42, then there may be more than one location where the water may freeze in a container. If there is more than one location where the water may freeze, the liquid container 10 may have more than one heating module. The additional heating modules may be in additional second bodies coupled to the first body. The heating modules may be coupled in any area that permits fluidic access between the first body and the additional body housing the heating module. According to certain implementations, such a watering apparatus can have two, three, four, five, six, or more heating modules, each of which can disposed within a separate second body (such that there is the same number of second bodies as heating modules) or can have no second bodies.

FIG. 13 depicts another alternative embodiment of a watering apparatus 8. The liquid container 10 in this particular apparatus 8 may comprise a tote 10. The tote 10 may have an opening (not shown) providing access to the interior of the tote 10. The opening can be covered with a cap 62. The cap 62 may be screwed into the opening (not shown). In some embodiments, the cap 62 may snap into place over the opening structure (not shown). Alternatively, the cap 62 may be attached using any other known means. In alternate embodiments, the liquid container 10 can be an intermediate bulk container 10. The container 10 may be molded to a shape. The shape of the container 10 may be round, square, or other shapes.

FIGS. 14A and 14B depict opposing sides of a second body 26, according to a further implementation. The second body 26 may be a cap 26 that attaches to a first body 10 (not shown). The first body 10 can be any of the first body 10 embodiments disclosed or contemplated herein. The cap 26 may have an inner surface 63, which faces the interior of the body 10 to which the cap 26 is attached. The cap 26 may also have an exterior surface 62. Components of the heating module 31 may be mounted or attached to both the interior and exterior surface 63, 62 of the cap 26. The cap 26 may comprise a cap wall 65 The exterior surface of the wall may be smooth or have ridges. The interior surface of the wall may have grooves that can be fitted over an opening structure, fastening the cap 26 to the first body 10.

As shown in FIG. 14B, the interior surface of the cap 26 may comprise the fan 33 and/or additional temperature sensors 39. The fan 33 may be attached to the interior surface of the cap 26 by screws, mechanical fasteners, or any other known fastening means. A temperature probe 28 may be housed within the cap 26.

As shown in FIG. 14A, the exterior of the cap 26 may comprise a power button 37, a temperature probe 39, or additional components. The fasteners attaching the fan 33 to the inside of the cap 26 may protrude on the exterior surface of the cap 26. These fasteners may be, for example, screws, or any other known mechanical fasteners.

Figure 15A:
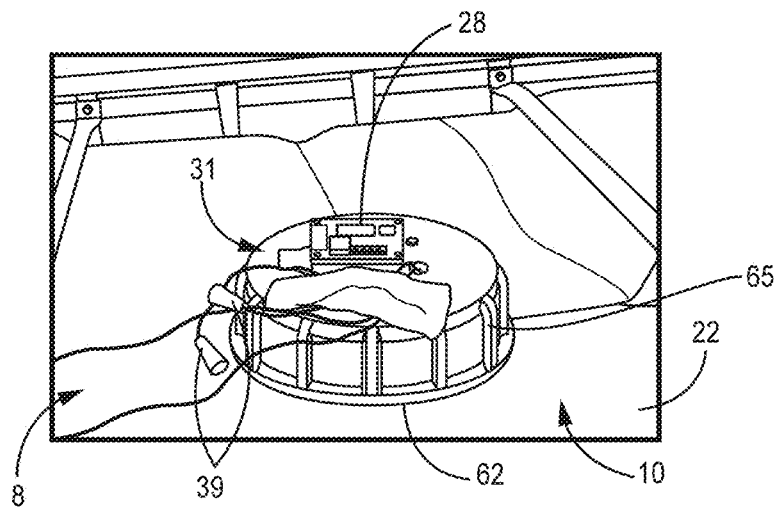
FIG. 15A and FIG. 15B are close-up perspective views of a liquid container, according to a further embodiment.
Figure 15B:
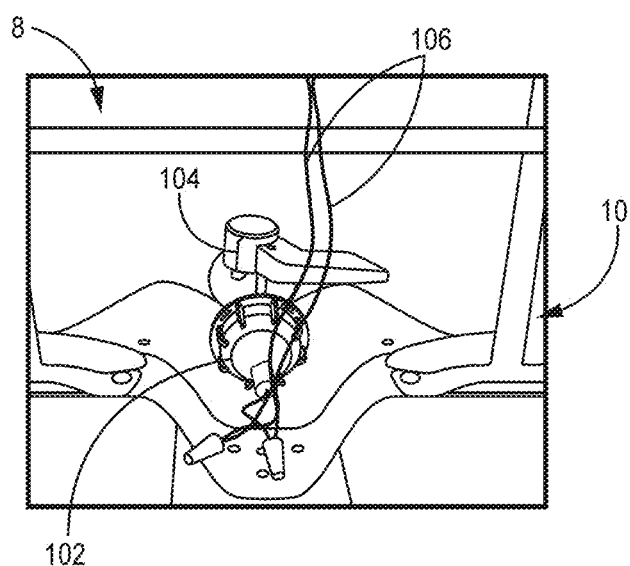

FIGS. 15A and 15B illustrate a cap 26 and heating module (not shown) on a different type of container 10. The container 10 may be insulated. As shown in FIG. 15A, the temperature sensor 28 may be attached to the exterior surface of the cap 26. The cap 26 may cover an opening (not shown) in the body of the liquid container 10 wherein the opening provides access such that liquid may be added to the container 10. A temperature probe 39 may be attached to a heating element 32 configured to regulate the temperature of a separate freeze point.

As shown in FIG. 15B, the liquid container 10 may comprise a spigot 104. The spigot 104 may be used to dispense liquid from the liquid container 10 into another container, for example, a bowl or bottle. Under freezing temperatures, the liquid may freeze around the spigot 104 location in the container 10, reducing a user's ability to retrieve liquid from the liquid container 10. The liquid container 10 may comprise temperature sensors 106 calibrated to recognize freezing temperatures at the spigot 104 location. The heating module may comprise a halogen bulb 102. The halogen bulb 102 may provide heat to the spigot location 104, increasing the temperature and reducing the risk of water freezing at the spigot location 104. The halogen bulb 102 may receive electricity when the temperature sensor 106 registers a low temperature point. A cycle of heating and cooling may be employed to prevent water from freezing at the spigot location 104.

Figure 16:
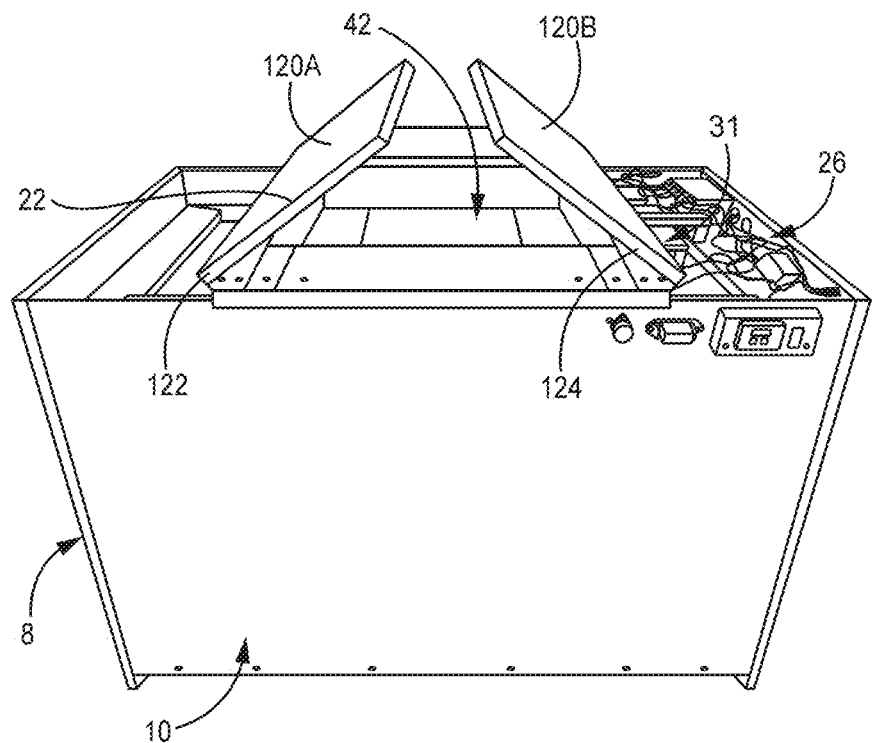
FIG. 16 is a perspective view of a liquid container, according to a further embodiment.

FIG. 16 illustrates a further alternative embodiment of the watering apparatus 8. In this embodiment, a drinking access point 42 is located within the lid 22 of the container 10. The lid 22 contains panels 120A, 120B pivoting about pivot points 122, 124. The lid panels may pivot about a left pivot point 122 and a right pivot point 124. The left panel 120A may provide access to the interior of the liquid container 10. The right panel 120B may provide access to the heating module of the liquid container 10.

Figure 17:
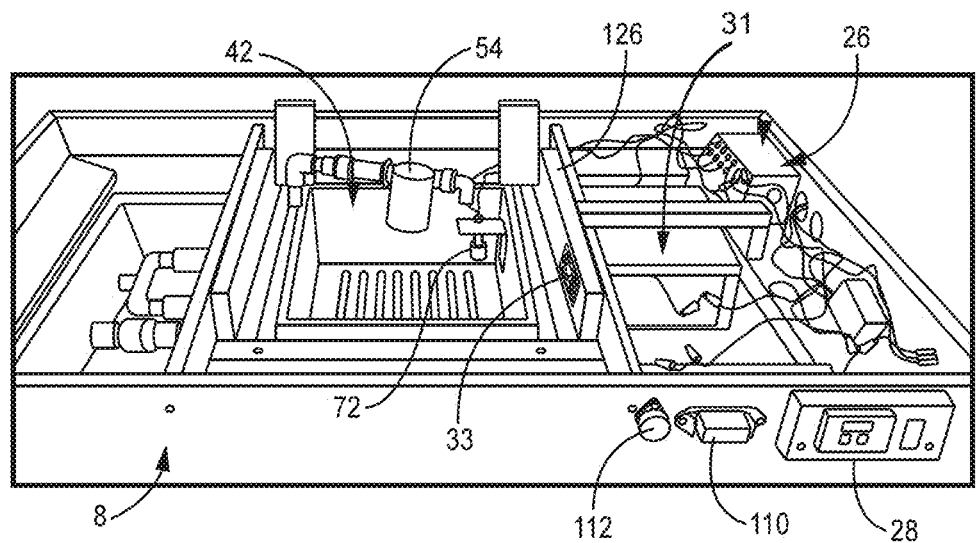
FIG. 17 is a close-up perspective view of a liquid container of FIG. 16 without a lid.

FIG. 17 illustrates the liquid container 10 of FIG. 16 without the lid 22. In this embodiment, the liquid access point 44 is disposed in the center of the bowl 42. A sensor 72 may be used to measure the water level. A water level control valve 54 may be used to measure the level of the water within the bowl 42.

To a side of the bowl 42 may be a panel 126 separating the bowl from the electrical components of the temperature regulation module 26 of the liquid container 10. Within that panel 126 may be an opening wherein the fan 33 of the temperature regulation module is placed. The wiring for the electrical components may be on the side of the panel opposite that of the bowl 42. The temperature control device 28 may protrude from the liquid container 10 such that it can be seen from the outside of the container 10.

In some embodiments, any of the watering apparatus implementations disclosed or contemplated herein can have additional components to alert a user that the water level is low. As shown, for example, in FIG. 17, these additional components may provide an auditory cue 112 or visual cue 110 that the water is low. An auditory cue may be, for example, buzzing or beeping. A visual cue may be, for example, a blinking light.

While the various systems described above are separate implementations, any of the individual components, mechanisms, or devices, and related features and functionality, within the various system embodiments described in detail above can be incorporated into any of the other system embodiments herein.

The terms "about" and "substantially," as used herein, refers to variation that can occur (including in numerical quantity or structure), for example, through typical measuring techniques and equipment, with respect to any quantifiable variable, including, but not limited to, mass, volume, time, distance, wavelength, frequency, voltage, current, and electromagnetic field. Further, there is certain inadvertent error and variation in the real world that is likely through differences in the manufacture, source, or precision of the components used to make the various components or carry out the methods and the like. The terms "about" and "substantially" also encompass these variations. The term "about" and "substantially" can include any variation of 5% or 10%, or any amount—including any integer—between 0% and 10%. Further, whether or not modified by the term "about" or "substantially," the claims include equivalents to the quantities or amounts.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range. Although the various embodiments have been described with reference to preferred implementations, persons skilled in the art will recognize that changes may be made in form and detail without departing from the spirit and scope thereof.

Although the various embodiments have been described with reference to preferred implementations, persons skilled in the art will recognize that changes may be made in form and detail without departing from the spirit and scope thereof.

What is claimed is:

1. A temperature regulation system, comprising:
    (a) a first body forming a first interior cavity, the first body comprising a first opening defined in a wall of the first body, wherein the first interior cavity is in fluidic communication with the first opening and wherein the first interior cavity is configured to contain a liquid;
    (b) a second body forming a second interior cavity, the second body comprising a second opening defined within a wall of the second body; and
    (c) a first temperature control module disposed within the second body comprising:
        (i) a temperature sensor;
        (ii) a fan; and
        (iii) a heating element,
    wherein the first temperature control module is in fluidic communication of a fluid comprising air with the first interior cavity via the first and second openings, and wherein the fan is configured to direct a flow of air from the second interior cavity to the first interior cavity at a location adjacent the liquid.

2. The temperature regulation system of claim 1, wherein the heating element of the first temperature control module comprises a positive temperature coefficient heating element.

3. The temperature regulation system of claim 2, wherein the first body comprises a removable top panel and the second body is coupled to the removable top panel of the first body.

4. The temperature regulation system of claim 3, further comprising a water access opening within removable top panel of the first body.

5. The temperature regulation system of claim 2, wherein an external surface of the second body is coupled to an interior surface of the first interior cavity of the first body.

6. The temperature regulation system of claim 2, wherein an external surface of the second body is coupled to an exterior surface of the first body.

7. The temperature regulation system of claim 2, wherein the first and second openings are disposed above a maximum height of a liquid disposed within the interior cavity of the first body.

8. The temperature regulation system of claim 2, further comprising a halogen bulb coupled to the first body of the temperature regulation system.

9. The temperature regulation system of claim 8, wherein the first body of the temperature regulation system is insulated.

10. The temperature regulation system of claim 1, further comprising a water level sensor in electrical communication with a water pump.

11. The temperature regulation system of claim 1, wherein the second body is a removable cap.

12. The temperature regulation system of claim 1, further comprising a drinking bowl coupled to the first body, wherein the temperature control module is in fluidic access with the drinking bowl such that air can flow from the temperature control module components to the drinking bowl.

13. A temperature regulation system for an animal watering device, comprising:
   (a) a liquid container forming a first interior cavity configured to contain a liquid; and
   (b) a first temperature control module comprising:
      (i) a temperature sensor;
      (ii) a fan; and
      (iii) a heating element,
   wherein the first temperature control module is in fluidic access of a fluid comprising air with the first interior cavity of the liquid container,
   wherein the first temperature control module is coupled to the liquid container, and
   wherein the fan is configured to direct a flow of air into the interior cavity at a location adjacent the liquid.

14. The temperature regulation system of claim 13, wherein the liquid container comprises a removable top panel and the temperature control module is coupled to an interior surface of the removable top panel of the liquid container.

15. The temperature regulation system of claim 13, further comprising a water level sensor in electrical communication a water pump.

16. The temperature regulation system of claim 15, further comprising a drinking bowl coupled to the liquid container, wherein the temperature control module is in fluidic access with the drinking bowl.

17. The temperature regulation system of claim 13, wherein the first temperature control module is coupled to the liquid container above a maximum liquid height of the liquid container.

18. A method of regulating temperature of a liquid container, comprising:
   (a) configuring a temperature sensor to recognize a predetermined air low temperature threshold, the temperature sensor operably connected to a temperature control module configured to store the predetermined air low temperature threshold;
   (b) configuring said temperature sensor to recognize a predetermined air high temperature threshold, wherein the temperature control module is configured to store the predetermined air high temperature threshold;
   (c) adding heated air to the liquid container when the temperature sensor detects the low air temperature threshold and ceasing the addition of heated air to the liquid container when said temperature sensor detects the air high temperature threshold, wherein the liquid container further comprises:
      (i) a first body forming a first interior cavity, the first body comprising a first opening defined in a wall of the first body, wherein the first interior cavity is in fluidic communication with the first opening;
      (ii) a second body forming a second interior cavity, the second body comprising a second opening defined within a wall of the second body; and
      (iii) a first temperature control module comprising:
         (i) a temperature sensor;
         (ii) a fan; and
         (iii) a heating element,
      wherein the first temperature control module is disposed within the second body,
      wherein the first temperature control module is in fluidic access with the first interior cavity via the first and second openings, and
      wherein the fan is configured to direct a flow of air from the second interior cavity to the first interior cavity at a location adjacent the liquid.

19. The method of claim 18, further comprising configuring a water level sensor coupled to the first body to recognize a user-selected water level threshold.

20. The method of claim 18, wherein the heating element comprises a positive temperature coefficient heating element.

* * * * *